United States Patent [19]

Hunt

[11] Patent Number: 5,570,973
[45] Date of Patent: Nov. 5, 1996

[54] METHOD AND SYSTEM FOR BIOREMEDIATION OF CONTAMINATED SOIL USING INOCULATED DIATOMACEOUS EARTH

[75] Inventor: Seth C. Hunt, Lakewood, Colo.

[73] Assignee: Foremost Solutions, Inc., Lakewood, Colo.

[21] Appl. No.: 272,816

[22] Filed: Jul. 11, 1994

[51] Int. Cl.$^6$ ............................. A62D 3/00; E02D 3/00; E02D 31/00
[52] U.S. Cl. ..................... 405/128; 166/246; 210/610; 435/262.5
[58] Field of Search ..................... 405/128; 166/246, 166/280, 308; 210/601, 610, 901; 435/262, 262.5

[56] References Cited

U.S. PATENT DOCUMENTS

| | | | |
|---|---|---|---|
| 4,493,895 | 1/1985 | Colaruotolo et al. | 210/610 |
| 4,859,594 | 8/1989 | Portier | 210/601 X |
| 4,987,068 | 1/1991 | Trosch et al. | 435/262 X |
| 5,133,625 | 7/1992 | Albergo et al. | 405/128 X |
| 5,246,309 | 9/1993 | Hobby | 405/128 |
| 5,263,795 | 11/1993 | Corey et al. | 405/128 |
| 5,286,140 | 2/1994 | Mather | 405/128 |

Primary Examiner—George A. Suchfield
Attorney, Agent, or Firm—Edwin H. Crabtree; Donald W. Margolis; Ramon L. Pizarro

[57] ABSTRACT

A system for in-situ bioremediation of contaminated soil and ground water wherein porous inorganic support spheres such as diatomaceous earth pellets are treated by inoculation with selected non-pathogenic microbes, ie. bacteria, for destroying or converting the contaminate. The contaminates may be hydrocarbons, sulphides, cyanides, nitrates, heavy metals and other chemicals. The porous cells of the diatomaceous earth pellets provide a home not only for the microbes but also for oxygen, water and other nutrients to help sustain the life of the augmented colonies of microbes introduced in the pellets. The contaminated soil is prepared for treatment by creating fractures and fissures therein using fluid pressure introduced through spaced apart holes drilled to selected depths. The depth of the drilled holes and the hole spacing will depend on the area of contamination. The diatomaceous earth pellets, with microbes stored therein, are then injected into the spaces of the fractures and fissures using air or liquid pressure. The diatomaceous earth pellets may range in size from 0.1 to 1.0 microns or larger. When the inoculated pellets are in place, the microbes have a permanent home to receive contaminates and to work from in destroying the contaminates. The drilled holes may also be retrofited with perforated pipe for supplementing the microbes with additional oxygen, water and nutrients or adding more pellets with microbes therein for completing the clean up of the contaminated soil and ground water.

13 Claims, 1 Drawing Sheet

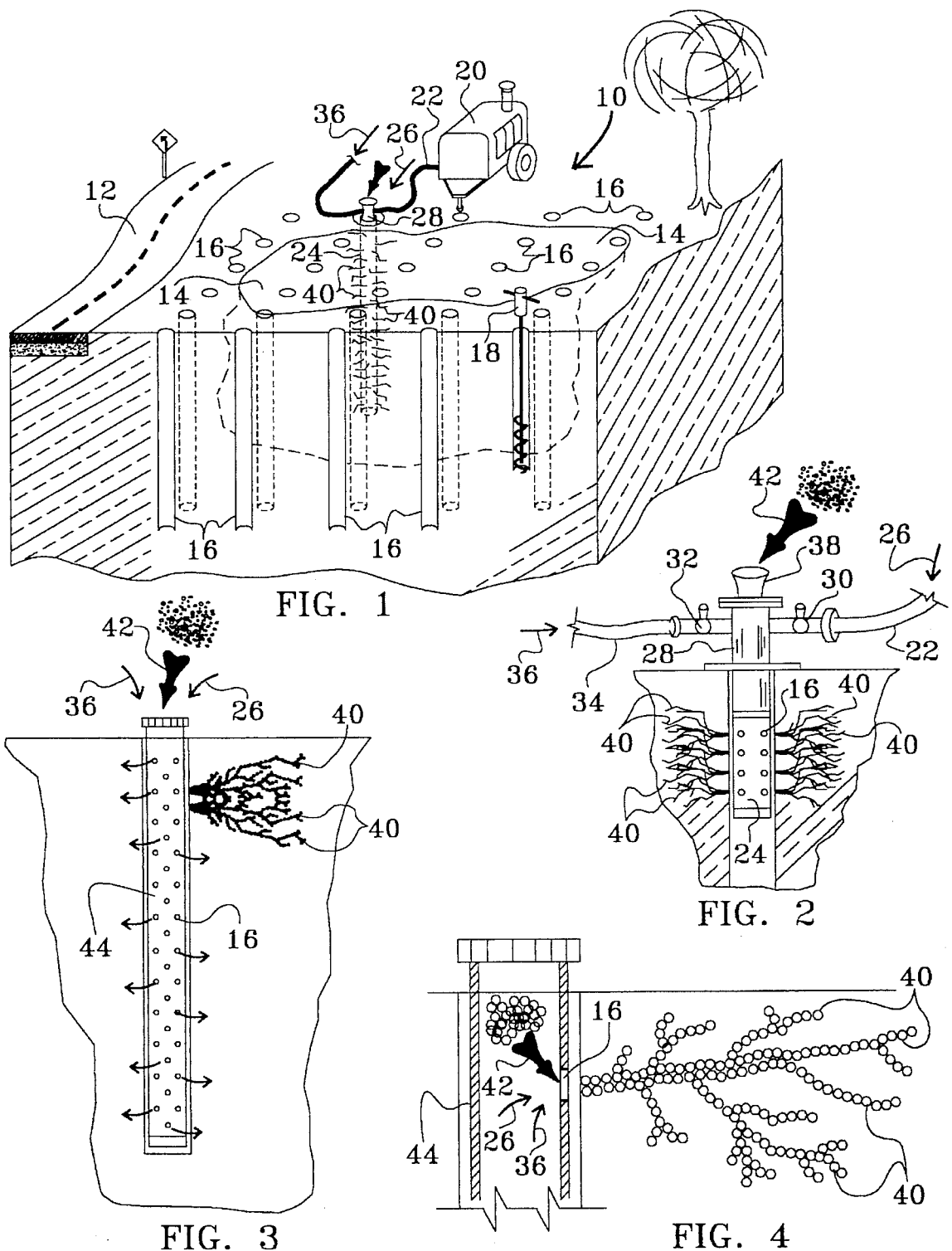

5,570,973

METHOD AND SYSTEM FOR BIOREMEDIATION OF CONTAMINATED SOIL USING INOCULATED DIATOMACEOUS EARTH

BACKGROUND OF THE INVENTION (a) Field of the Invention

This invention relates the use of selected non-pathogenic microbes for treating contaminated soil and ground water and more particularly, but not by way of limitation, to a system wherein microbes are introduced by inoculation into a porous inorganic support sphere, such as diatomaceous earth pellets, and injected into fractures and fissures in the contaminated soil for destroying or converting the contaminate.

(b) Discussion of Prior Art

In U.S. Pat. No. 5,133,625 to Albergo et al. a method and apparatus used for subsurface bioremediation is described. Microorganisms, nutrients and gases are introduced into the soil using a push rod or cylinder connected to a delivery system on top of the ground. Also, U.S. Pat. No. 5,263,795 to Corey et al. and U.S. Pat. No. 3,094,846 to Peeler, Jr. describe in-situ remediation systems for treating sulfide contaminated soils from coal mining operations and the like.

U.S. Pat. No. 4,743,545 to Torobin, U.S. Pat. No. 4,987,068 to Trosch et al. and U.S. Pat. No. 5,096,814 to Aivasidis et al. describe different types of macroporous and microporous inorganic carriers used with microorganisms. The treated porous material is used for degradation of municipal sewage and industrial waste.

In U.S. Pat. Nos. 4,682,550 and 4,807,454 to Stanley Joy, a hand-held apparatus, method and technique is disclosed for loosening, aerating and fertilizing plant and tree roots. The technique described in the Joy patents is applicable to the subject invention as to loosening, aerating and adding nutrients to a subsurface area and is incorporated herein by reference. Also, U.S. Pat. No. 4,429,647 to Zinck describes a method of loosening used soil with a probe and compressed air. Further, U.S. Pat. Nos. 2,083,153 and 1,814,446 to Irish and U.S. Pat. No. 429,994 to Botter describe older type of equipment for aerating soil and treating the soil with fertilizers etc.

None of the above mentioned prior art patents specifically disclose the unique features and method steps of the subject system for in-situ bioremediation of contaminated soil as described herein.

SUMMARY OF THE INVENTION

In view of the foregoing, it is a primary object of the invention to treat contaminated soil and ground water in-situ and destroy or convert the contaminate.

Another object of the present invention is to eliminate the need of removing contaminated soil and the expense associated with removing and transporting the contaminated soil to a land fill.

Still another object of the system for bioremediation is to treat the contaminate soil using non-pathogenic microbes which are similar to the natural occurring bacteria in the area surrounding the contaminated site.

A further object of the invention is the system for bioremediation can be practiced with little disturbance of the existing contamination site other than drilling spaced holes into the ground surface for introducing the diatomaceous earth pellets with microbes housed therein.

The subject system is used for in-situ bioremediation of contaminated soil and ground water wherein porous inorganic support spheres such as diatomaceous earth pellets are treated by inoculation with selected non-pathogenic microbes, ie. bacteria, for destroying or converting the contaminate. The contaminates may be hydrocarbons, sulphides, cyanides and other chemicals. The porous cells of the diatomaceous earth pellets provide a home not only for the microbes but also for oxygen, water and other nutrients to help sustain the life of the augmented colonies of microbes introduced in the pellets. The contaminated soil is first prepared for treatment by creating fractures and fissures therein using a large volume of fluid pressure introduced through spaced apart holes drilled to selected depths. The depth of the drilled holes and the hole spacing will depend on the area of contamination. The diatomaceous earth pellets, with microbes already stored therein, are then injected into the spaces of the fractures and fissures using air or liquid pressure. The diatomaceous earth pellets may range in size from 0.1 to 1.0 microns or larger. When the inoculated pellets are in place, the microbes have a permanent home to receive contaminates and to work from in destroying the contaminates. The drilled holes may also be retrofited with perforated pipe for supplementing the microbes with additional oxygen, water and nutrients or adding more pellets with microbes therein for completing the clean up of the contaminated soil and ground water.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of a contaminated site, shown in dark shading, wherein holes have been drilled in a spaced pattern for practicing the subject in-situ bioremediation system.

FIG. 2 is a sectional front view of an upper portion of one of the drill holes shown in FIG. 1 wherein fluid pressure is introduces in the hole for creating fractures and fissures in the subsurface prior to injecting the diatomaceous earth pellets with microbes stored therein.

FIG. 3 is another sectional front view of one of the drill holes having a perforated pipe therein for further introduction of additional pellets with microbes, shown as black dots, along with addition air, water and other nutrients. In this view the fractures and fissures in the contaminated soil are shown filled with diatomaceous earth pellets with microbes. The pellets are shown as black dots.

FIG. 4 is an enlarged sectional front view of a portion of a subsurface area with diatomaceous earth pellets with microbes, shown as small circles, having filed a fracture and in place for bioremediation of the contaminate in the soil.

DESCRIPTION OF THE PREFERRED EMBODIMENTS

In FIG. 1, a contaminated site is shown having general reference numeral 10 wherein the site 10, next to a highway 12, is being prepared for bioremediation using the subject system. The site 10, for example can be an old service station with underground storage tanks that leaked, an old chemical storage area where drums of chemicals have leaked over a period of time into the ground subsurface and other like contaminated locations. The contamination of the soil is shown in dark shading and having numeral 14. The site 10 is shown with a plurality of spaced apart drill holes 16 forming a grid surrounding and through the contaminated soil 14. An auger 18 is shown drilling one of the holes 14 to complete the grid. The grid pattern and the depth and spacing of the drill holes 16 will be based on the size of the contaminated area, the depth of the contamination, type of soil such as sand, clay, shale, etc. and other related fractures such as moisture content, ground water present, type of contaminate, amount of contaminate and natural bacteria common to the area. The depth of the holes 16 may be in a range of 10 to 20 feet or greater.

After the contaminated soil 14 has been tested as to the amount and type of contaminate and the grid pattern has been completed as to proper hole spacing and sufficient hole depth, fluid pressure such as compressed air from an air compressor 20 via an air line 22 is then applied through a section of a perforated pipe 24 which is lowered into each hole 16. The compressed air is illustrated in the drawings as an arrow 26.

In FIG. 2, the sectional perforated pipe 24 is shown in greater detail with the top of the pipe 24 attached to a valve control housing 28 having an air valve 30 for turning on and off the compressed air 26. The valve control housing 28 also includes a water valve 32 connected to a water line 34 for applying water under pressure through the perforated pipe 24 and into the drill holes 16 and the surrounding subsurface. The water under pressure is shown in the drawings as arrow 36. Further, the valve control housing 28 includes an open funnel 38 in the top of the housing 28 for introducing the porous inorganic support spheres, such as diatomaceous earth, with selected microbes into the air and water stream and through the openings in the perforated pipe 24 in the drill holes 16.

Referring now to FIG. 1 and FIG. 2, it can be seen that the valve control housing 28 has been connected to a perforated pipe 24 received in one of the drill holes 16. Be installing different sectional lengths of perforated pipe, for example 2 or 4 foot sections, fluid pressure such as compressed air and water under pressure is used to create fractures and fissures radially outward from the circumference of each drill hole 16. FIG. 2 illustrates the use of a single section of perforated pipe 24 with fractures and fissures formed in the surrounding soil. Each of the drill holes 16 are treated in this manner until the contaminated area has been dramatically loosened by fracturing and forming cracks and fissures therein. If the drill hole 16 for example is 20 feet deep then five of the 4 foot sections would be coupled together and fluid pressure applied to the surrounding soil as the sections of drill pipe 24 are lowered into the hole 16. The fractures and fissures in the surrounding soil are shown as branch-like lines 40 in the drawings and extend outwardly in a range of 10 to 12 feet depending the air pressure and volume of air applied. The fractures and fissures 40 formed in the surrounding soil under fluid pressure will follow a path of least resistance and this path would be similar to a path followed by the contaminates when leached from the ground surface into the subsurface over a period of time.

Also, it should be noted that while high pressure air of 100 psi or more is helpful in creating fractures and fissures, large amounts of air pressure, such as volumes of 200 cfm and greater, is of greater importance in loosening and breaking up the subsurface soil for complete bioremediation.

When the contaminated area 14 has been prepared as described above, the subsurface is now ready for receiving porous inorganic spheres such as diatomaceous earth pellets with selected microbes housed therein. The pellets may be introduced into the subsurface opening after the fractures and fissures 40 are formed by air pressure, water pressure, or both. The pellets with microbes are indicated in the drawings by large arrow 42 and black dots. The pellets 42 may vary in size from 0.1 to 1.0 microns or larger. The size of pellets 42 will depend on the type of soil, the contaminates encountered, and the size of the fractures and fissures 40 in the contaminated area 14. The pellets may be a porous ceramic similar to a product having a brand name of "ISOLITE" which is made in Japan and marketed in the United States by Sumitomo Corporation of America. "ISOLITE" is ideally suited for housing microbes and enzymes when treating contaminate soil and ground water using the subject system for bioremediation.

In FIG. 3, a portion of the fractures and fissures 40 in one of the drill holes 16 is shown with the pellets 42 with selected microbes in place and ready for bioremediation of the surrounding contaminates. The microbes have a permanent home in the pellets 42 for receiving and destroying the contaminate as it is drawn into the porous cells of the pellets or the microbes can venture forth from the cell homes of pellets or from the outer surface of the pellets in destroying or converting the contaminate. In this drawing, the drill hole 16 is shown with a perforated plastic stand pipe 44 extending the length of the hole. The pipe 44 can be left permanently in the hole for adding additional air 26, water 36 or nutrients such as humate from supplementing the growth of the microbes housed in the pellets 42. Also, if required additional pellets 42 can be added through the stand pipe 44 to help accelerate the bioremediation process.

In FIG. 4 an enlarged sectional view of a cross section of an upper portion of the stand pipe 44 is shown with the pellets 42 shown as small circles completely filling the fractures and fissures 40. As mentioned above the diatomaceous earth pellets may range in size from 0.1 to 1.0 microns or larger depending on the application and the size and shapes of the openings in the subsurface or when treating ground water in the soil.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A method for in-situ bioremediation of contaminated soil and ground water wherein porous inorganic support spheres such as diatomaceous earth pellets are treated by inoculation with selected non-pathogenic microbes, ie. bacteria, for destroying or converting the contaminate, the steps comprising:

preparing and treating the contaminated soil by creating fractures and fissures therein using fluid pressure introduced through spaced apart drill holes drilled to selected depths;

inoculating cells of the porous inorganic support spheres with a selected microbe designed to destroy or convert the contaminate; and introducing said support spheres with microbes under pressure into the fractures and fissures of the contaminated soil.

2. The method as described in claim 1 further including the step of installing a perforated pipe in each of said drill holes.

3. The method as described in claim 2 further including the step of introducing air, water and nutrients under pressure through said perforated pipe and into the fractures and fissures of the contaminated soil for supplementing the growth of the microbes in the support spheres, this step after the step of introducing said support spheres with microbes under pressure.

4. The method as described in claim 3 further including the step of introducing additional support spheres with microbes under pressure through said perforated pipe and into the fractures and fissures of the contaminated soil and for supplementing and adding to the bioremediation of the contaminated soil and ground water, this step after the step of introducing air, water and nutrients under pressure.

5. The method as described in claim 1 wherein the step of preparing and treating the contaminated soil by creating fractures and fissures therein using fluid pressure includes the drilling of spaced apart drill holes in a grid pattern surrounding the contaminated soil, said drill holes drilled to a depth of 10 to 20 feet and greater.

6. The method as describe in claim 1 wherein the step of inoculating the cells of the porous inorganic support spheres includes inoculating with a microbe common to the natural occurring bacteria found in the contaminate soil and surrounding area.

7. A method for in-situ bioremediation of contaminated soil and ground water wherein porous inorganic support spheres are treated by inoculation with selected non-pathogenic microbes, ie. bacteria, for destroying or converting the contaminate, the steps comprising:

preparing and treating the contaminated soil by creating fractures and fissures therein using fluid pressure introduced through spaced apart drill holes drilled in a grid pattern to selected depths and surrounding the contaminated soil;

inoculating cells of the porous inorganic support spheres with a selected microbes common to the naturally surrounding bacteria found in the contaminated soil and designed to destroy or convert the contaminate;

introducing said support spheres with microbes under air pressure into the fractures and fissures of the contaminated soil; and introducing air, water and nutrients into the fractures and fissures with the support spheres and microbes to supplement the growth of the microbes in the support spheres.

8. The method as described in claim 7 further including the step of installing a perforated pipe in each of said drill holes in the grid pattern.

9. The method as described in claim 8 further including the step of introducing additional support spheres with microbes under air pressure through said perforated pipe and into the fractures and fissures of the contaminated soil and for supplementing and adding to the bioremediation of the contaminated soil and ground water.

10. The method as described in claim 9 further including the step of introducing additional air, water and nutrients with the support spheres and microbes under pressure through said perforated pipe and into the fractures and fissures of the contaminated soil and for supplementing and adding to the bioremediation of the contaminated soil and ground water.

11. The method as described in claim 7 wherein the step of preparing and treating the contaminated soil by creating fractures and fissures therein using fluid pressure includes the drilling of spaced apart drill holes in the grid pattern to a depth of 10 to 20 feet and greater.

12. The method as described in claim 7 wherein the support spheres are in the form of pellets.

13. A method for in-situ bioremediation of contaminated soil and ground water wherein porous inorganic support spheres are treated by inoculation with selected non-pathogenic microbes, ie. bacteria, for destroying or converting the contaminate, the steps comprising:

preparing and treating the contaminated soil by creating fractures and fissures therein using fluid pressure introduced through spaced apart drill holes drilled in a grid pattern to selected depths and surrounding the contaminated soil;

inoculating cells of the porous inorganic support spheres of diatomaceous earth pellets with a selected microbes common to the naturally surrounding bacteria found in the contaminated soil and designed to destroy or convert the contaminate;

introducing said support spheres with microbes under air pressure into the fractures and fissures of the contaminated soil; and installing a perforated pipe in each of said drill holes in the grid pattern for introducing additional support spheres with microbes, air, water and nutrients into the fractures and fissures to supplement the growth of the microbes in the support spheres.

* * * * *